(12) United States Patent
Chu

(10) Patent No.: US 8,290,962 B1
(45) Date of Patent: Oct. 16, 2012

(54) DETERMINING THE RELATIONSHIP BETWEEN SOURCE CODE BASES

(75) Inventor: Andy Chu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 11/236,859

(22) Filed: Sep. 28, 2005

(51) Int. Cl.
*G06F 7/00* (2006.01)
*G06F 17/00* (2006.01)

(52) U.S. Cl. ........ 707/749; 707/748; 707/758; 707/737; 707/736; 706/48; 715/228

(58) Field of Classification Search .................. None
See application file for complete search history.

(56) References Cited

U.S. PATENT DOCUMENTS

| | | | | |
|---|---|---|---|---|
| 5,086,402 A | * | 2/1992 | Sterling, II | 709/246 |
| 5,574,898 A | * | 11/1996 | Leblang et al. | 707/1 |
| 5,596,736 A | * | 1/1997 | Kerns | 711/4 |
| 5,900,000 A | * | 5/1999 | Korenshtein | 707/200 |
| 6,349,296 B1 | * | 2/2002 | Broder et al. | 707/3 |
| 6,353,827 B1 | * | 3/2002 | Davies et al. | 707/6 |
| 6,532,469 B1 | * | 3/2003 | Feldman et al. | 707/102 |
| 7,219,034 B2 | * | 5/2007 | McGee et al. | 707/101 |
| 2003/0120685 A1 | * | 6/2003 | Duncombe et al. | 707/200 |
| 2003/0182295 A1 | * | 9/2003 | Ukai et al. | 707/100 |
| 2003/0229537 A1 | * | 12/2003 | Dunning et al. | 705/10 |
| 2004/0068396 A1 | * | 4/2004 | Kawatani | 703/2 |
| 2004/0205524 A1 | * | 10/2004 | Richter et al. | 715/503 |
| 2005/0108266 A1 | * | 5/2005 | Cao et al. | 707/101 |
| 2005/0114840 A1 | * | 5/2005 | Zeidman | 717/126 |
| 2005/0234887 A1 | * | 10/2005 | Harako | 707/3 |
| 2006/0004528 A1 | * | 1/2006 | Uehara et al. | 707/6 |
| 2006/0235823 A1 | * | 10/2006 | Chong et al. | 707/1 |

OTHER PUBLICATIONS

Goldstein et al., "Creating and evaluating multi-document sentence extract summaries", 2000, ACM, Proceedings of the ninth international conference on Information and Knowledge Management, pp. 165-172.*

* cited by examiner

*Primary Examiner* — Jau-Shya Meng
(74) *Attorney, Agent, or Firm* — Harrity & Harrity, LLP

(57) ABSTRACT

An automated technique compares two sets of documents (such as two source codebases) to automatically determine documents within each set that are similar to one another. The technique constructs a matrix relating pairs of documents from the first and second sets of documents to lines that occur in both documents in each of the pairs of documents. A similarity score is calculated for each of the pairs of documents based on the lines from the matrix.

26 Claims, 11 Drawing Sheets

FIG. 6

SET1 (Document set A)

| FILE | LINES IN FILES |
|---|---|
| $A_0$ | a, b, c, d, e, f, g, h, i, j |
| $A_1$ | n, m, l, k, j, i, h, g, f, m, l, k, j, i, h, g, f |
| $A_2$ | d, f, h, j, l |
| $A_3$ | b, e, h, k, n, q, t |

(each row marked 610)

SET2 (Document set B)

| FILE | LINES IN FILES |
|---|---|
| $B_0$ | o, n, m, l, k, j, i, h, g, f, o, n, m, l, k, j, i, h, g, f |
| $B_1$ | d, f, h, j, l |
| $B_2$ | b, e, h, k, n, q, t |
| $B_3$ | d, e, f, g |
| $B_4$ | a, e, i, m, q |

(each row marked 620)

| LINE | FILE(S) IN SET1 |
|---|---|
| a | $A_0$ |
| b | $A_0, A_3$ |
| c | $A_0$ |
| d | $A_0, A_2$ |
| e | $A_0, A_3$ |
| f | $A_0, A_1, A_2$ |
| g | $A_0, A_1$ |
| h | $A_0, A_1, A_2, A_3$ |
| i | $A_0, A_1$ |
| j | $A_0, A_1, A_2$ |
| k | $A_1, A_3$ |
| l | $A_1, A_2$ |
| m | $A_1$ |
| n | $A_1, A_3$ |
| q | $A_3$ |
| t | $A_3$ |

725

| LINE | FILE(S) IN SET2 |
|---|---|
| a | $B_4$ |
| b | $B_2$ |
| d | $B_1, B_3$ |
| e | $B_2, B_3, B_4$ |
| f | $B_0, B_1, B_3$ |
| g | $B_0, B_3$ |
| h | $B_0, B_1, B_2$ |
| i | $B_0, B_4$ |
| j | $B_0, B_1$ |
| k | $B_0, B_2$ |
| l | $B_0, B_1$ |
| m | $B_0, B_4$ |
| n | $B_0, B_2$ |
| o | $B_0$ |
| q | $B_2, B_4$ |
| t | $B_2$ |

| LINE | FILE(S) IN SET1 | FILE(S) IN SET2 |
|---|---|---|
| a | $A_0$ | $B_4$ |
| b | $A_0, A_3$ | $B_2$ |
| d | $A_0, A_2$ | $B_1, B_3$ |
| e | $A_0, A_3$ | $B_2, B_3, B_4$ |
| f | $A_0, A_1, A_2$ | $B_0, B_1, B_3$ |
| g | $A_0, A_1$ | $B_0, B_3$ |
| h | $A_0, A_1, A_2, A_3$ | $B_0, B_1, B_2$ |
| i | $A_0, A_1$ | $B_0, B_4$ |
| j | $A_0, A_1, A_2$ | $B_0, B_1$ |
| k | $A_1, A_3$ | $B_0, B_2$ |
| l | $A_1, A_2$ | $B_0, B_1$ |
| m | $A_1$ | $B_0, B_4$ |
| n | $A_1, A_3$ | $B_0, B_2$ |
| q | $A_3$ | $B_2, B_4$ |
| t | $A_3$ | $B_2$ |

| FILE PAIRS (SET1, SET2) | NUMBER OF COMMON LINES IN EACH FILE PAIR |
|---|---|
| $(A_0, B_0)$ | 5 |
| $(A_0, B_1)$ | 4 |
| $(A_0, B_2)$ | 3 |
| $(A_0, B_3)$ | 4 |
| $(A_0, B_4)$ | 3 |
| $(A_1, B_0)$ | 9 |
| $(A_1, B_1)$ | 4 |
| ... | |
| $(A_m, B_n)$ | |

FIG. 9

| FILE PAIRS (SET1, SET2) | NUMBER OF COMMON LINES IN EACH FILE PAIR | SIMILARITY SCORE |
|---|---|---|
| $(A_0, B_0)$ | 5 | 0.5 |
| $(A_0, B_1)$ | 4 | 0.8 |
| $(A_0, B_2)$ | 3 | 0.43 |
| $(A_0, B_3)$ | 4 | 1.0 |
| $(A_0, B_4)$ | 3 | 0.6 |
| $(A_1, B_0)$ | 9 | 0.53 |
| $(A_1, B_1)$ | 4 | 0.8 |
| ... | | |
| $(m, n)$ | | |

1011 ↗ (SIMILARITY SCORE)

FIG. 10

| FIRST SET | SECOND SET | SIMILARITY SCORE |
|---|---|---|
| $A_3$ | $B_2$ | 1.0 |
| $A_1$ | $B_0$ | 1.0 |
| $A_0$ | $B_3$ | 1.0 |
| $A_2$ | $B_1$ | 1.0 |
| $A_1$ | $B_1$ | 0.8 |
| $A_0$ | $B_1$ | 0.8 |
| $A_2$ | $B_0$ | 0.8 |
| $A_0$ | $B_4$ | 0.6 |
| $A_1$ | $B_0$ | 0.5 |
| $A_3$ | $B_2$ | 0.42 |
| $A_0$ | $B_0$ | 0.42 |
| $A_3$ | $B_2$ | 0.42 |
| $A_1$ | $B_4$ | 0.4 |
| $A_1$ | $B_4$ | 0.4 |
| $A_2$ | $B_3$ | 0.4 |
| $A_3$ | $B_3$ | 0.4 |
| $A_3$ | $B_1$ | 0.2 |
| $A_2$ | $B_2$ | 0.2 |

FIG. 11

DETERMINING THE RELATIONSHIP BETWEEN SOURCE CODE BASES

BACKGROUND

A. Field of the Invention

Implementations consistent with the principles of the invention relate generally to similarity detection and, more particularly, to comparing sets of documents to find similarities or differences.

B. Description of Related Art

There are a number of situations in which it may be desirable to be able to determine whether documents, or sets of documents, are similar to one another. One particular instance of this situation occurs in software engineering. Consider the situation in which there are two bases of source program code ("codebases") that each define different versions of the same program. Each codebase may include, for example, a number of source code files. In some situations, the number of files may number into the hundreds or thousands. It may be desirable to determine what the differences are between the two codebases.

One existing technique for monitoring differences between two sets of documents, such as two sets of files, is to keep an explicit history of changes in the files. That is, each time a file is modified, the changes are logged and stored. Keeping an explicit history of file differences, however, is not always possible or may simply have not been done when the files were being modified.

Another existing technique for monitoring differences between two sets of files is to compare the files to obtain a list of differences between the files. Software for comparing files is well known. Comparing two files to obtain a list of their differences, however, generally only works well if the filename and directory structure of the file sets are similar or if the number of files is small enough to manually examine.

When relatively large codebases are being examined without an explicit history of changes, however, existing techniques can be lacking in the ability to effectively determine the differences in the codebases.

SUMMARY

One aspect is directed to a computer-implemented method for comparing a first set of documents to a second set of documents. The method includes constructing a matrix relating pairs of documents from the first and second sets of documents to a number of lines that are present in documents in each of the pairs of documents. The method further includes calculating similarity scores for the pairs of documents based on the matrix and outputting the similarity scores.

Yet another aspect is directed to a method that includes receiving an identification of a first set of documents and receiving an identification of a second set of documents. The method further includes processing document segments that represent portions of the documents in the first and second sets to construct an index that relates each of the segments to the documents in which the segment occurs. The method still further includes calculating similarity scores for pairs of documents in the first and second sets and outputting the similarity scores.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 6 is a diagram illustrating two exemplary file sets;

FIG. 7 is a diagram illustrating portions of indexes relating lines in files to the files in which the lines occur;

FIG. 8 is a diagram illustrating a portion of an exemplary composite index;

FIG. 9 is a diagram illustrating an exemplary portion of a term count matrix;

FIG. 10 is a diagram illustrating exemplary similarity scores calculated for pairs of documents; and FIG. 11 is a diagram illustrating an exemplary sorted list of file pairs and their corresponding similarity scores.

DETAILED DESCRIPTION

The following detailed description of the invention refers to the accompanying drawings. The detailed description does not limit the invention.

Overview

Figure 1:
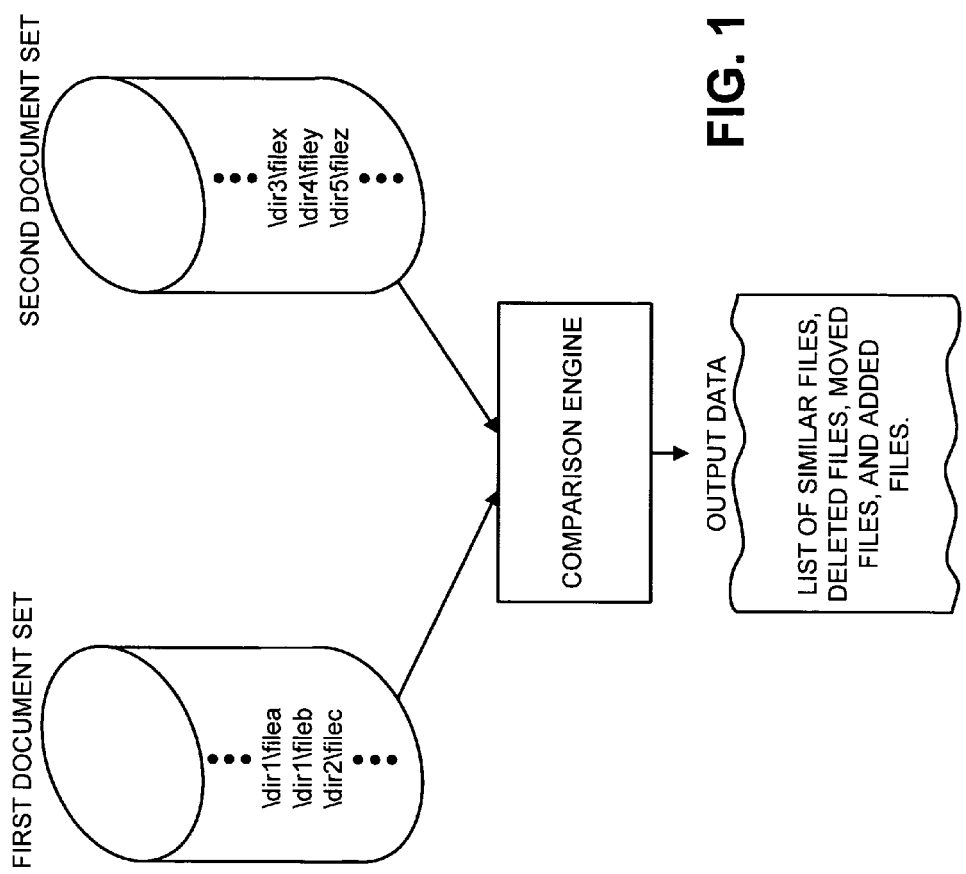
FIG. 1 is a diagram illustrating an example of the comparison of two sets of documents.

Techniques consistent with aspects of the invention can compare two sets of documents and automatically determine documents within each set that are similar to one another. FIG. 1 is a diagram illustrating an example of the comparison of two sets of documents. A first document set and a second document set are input to a software tool that will be called a comparison engine herein.

In this example, each document set may include a number of files, possibly hundreds or thousands of files. The file names across the two sets may or may not be related to the contents of the files. That is, some of the files may contain similar data but have different names while some of the files may have the same names but include different data.

The comparison engine may receive the two sets of files and generate output data that assists users in analyzing the similarities between the two sets of files. The output data may describe, or be manipulated to describe, which files are similar, which files were deleted from the second set to the first set, and which files have been newly added to the second set.

In the exemplary implementations described herein, the document sets will be described as files in different versions of software codebases. However, one of ordinary skill in the art will recognize that techniques similar to those described herein could be applied to other applications in which it is desirable to compare different sets or versions of documents.

Exemplary System

Figure 2:
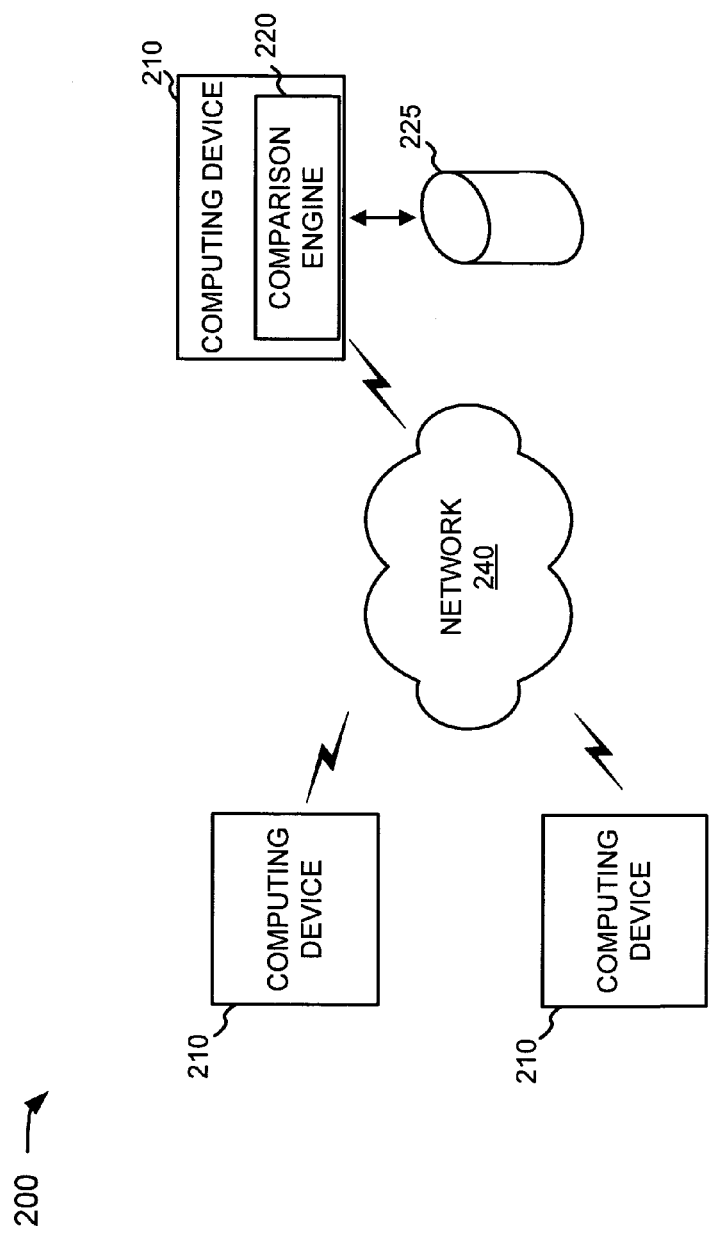
FIG. 2 is a diagram of an exemplary system in which systems and methods consistent with the principles of the invention may be implemented.

FIG. 2 is an exemplary diagram of a system 200 in which systems and methods consistent with the principles of the invention may be implemented. System 200 may include computing devices 210 connected via a network 240. Network 240 may include a local area network (LAN), a wide area network (WAN), a telephone network, such as the Public Switched Telephone Network (PSTN), an intranet, the Internet, or a combination of networks. Computing devices 210 may include client computing devices, server computing devices, or other types of computing devices. Three computing devices 210 are illustrated as connected to network 240 for simplicity. In practice, there may be more or fewer computing devices connected to a network.

A computing device 210 may include a device, such as a personal computer, wireless telephone, a personal digital assistant (PDA), a lap top, or another type of computation or communication device, a thread or process running on one of these devices, and/or an object executable by one of these devices. Computing devices 210 may connect to network 240 via wired, wireless, or optical connections.

One of computing devices 210 is illustrated in FIG. 2 as including comparison engine 220. As mentioned, comparison engine 220 may be a software tool that assists users in comparing two sets of documents. The two sets of documents may be stored in a database 225 or in other storage devices or structures.

Exemplary Computing

Device Architecture

Figure 3:
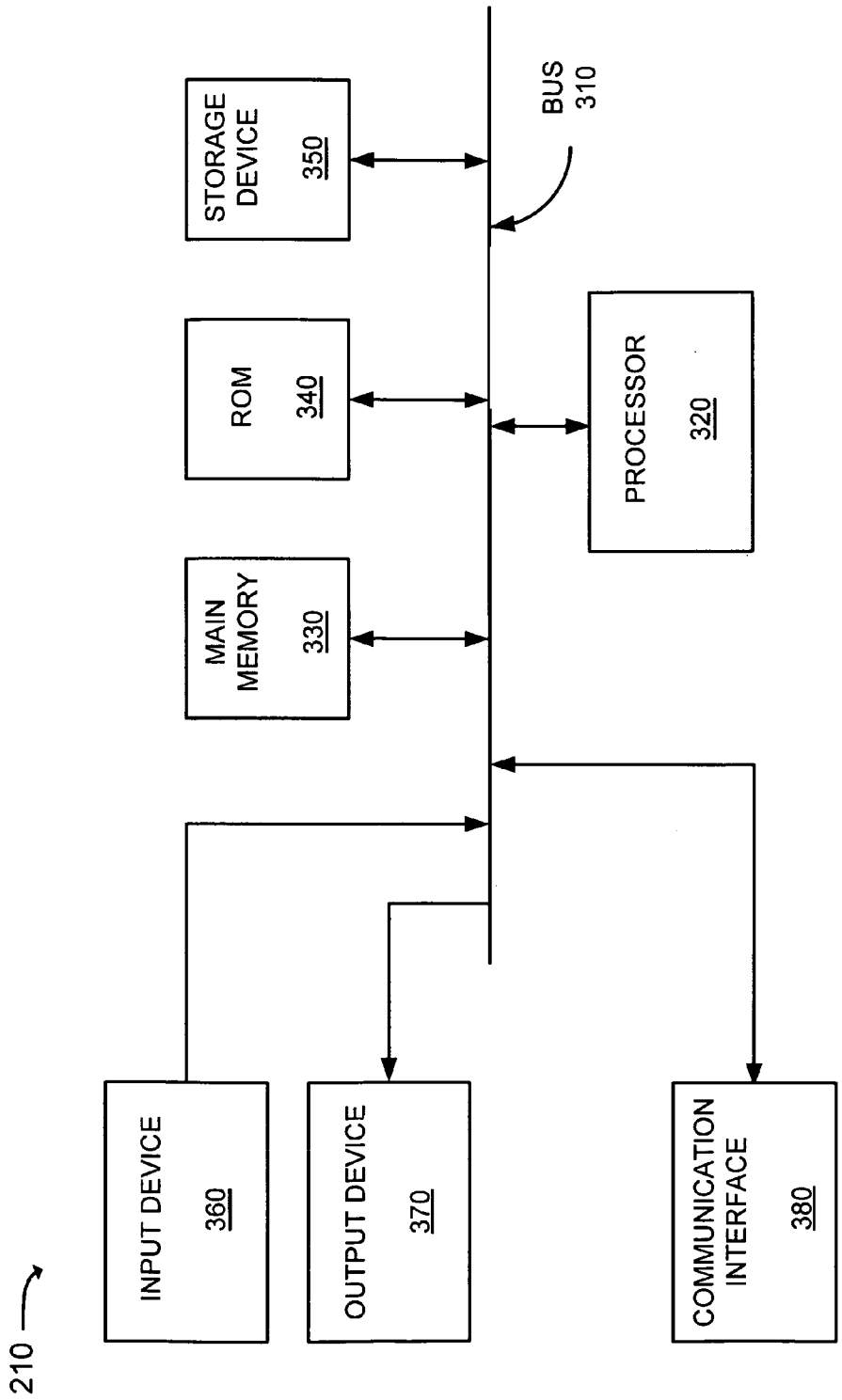
FIG. 3 is an exemplary diagram of the computing device shown in FIG. 2.

FIG. 3 is an exemplary diagram of computing device 210. Computing device 210 may include a bus 310, a processor 320, a main memory 330, a read only memory (ROM) 340, a storage device 350, an input device 360, an output device 370, and a communication interface 380. Bus 310 may include a path that permits communication among the components of computing device 210.

Processor 320 may include any type of conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits a user to input information to computing device 210, such as a keyboard, a mouse, a pen, voice recognition and/or biometric mechanisms, etc. Output device 370 may include a conventional mechanism that outputs information to the user, including a display, a printer, a speaker, etc. Communication interface 380 may include any transceiver-like mechanism that enables computing device 210 to communicate with other devices and/or systems. For example, communication interface 380 may include mechanisms for communicating with another device or system via a network, such as network 240.

Comparison engine 220 may be implemented in software and stored in a computer-readable medium, such as memory 330. A computer-readable medium may be defined as one or more physical or logical memory devices and/or carrier waves.

The software instructions defining comparison engine 220 may be read into memory 330 from another computer-readable medium, such as data storage device 350, or from another device via communication interface 380. The software instructions contained in memory 330 cause processor 320 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

Comparison Engine 220

Figure 4:
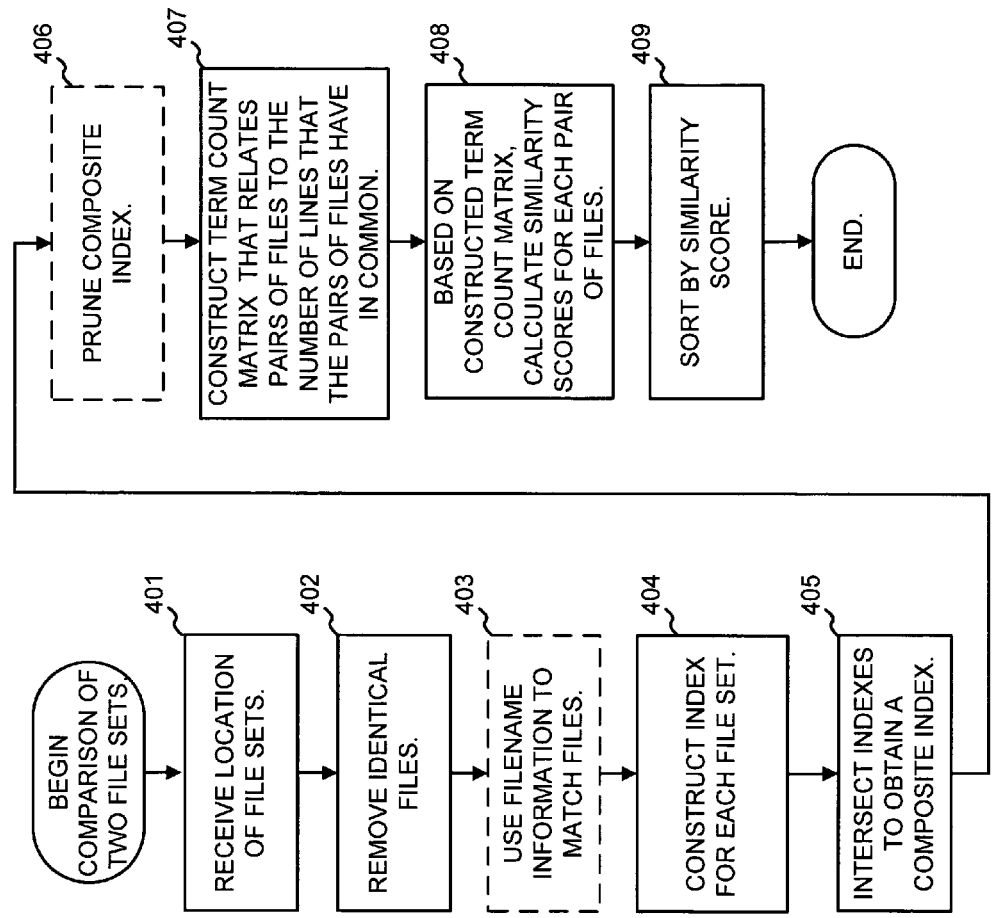
FIG. 4 is a flow chart illustrating exemplary operations performed by the comparison engine shown in FIG. 2 when comparing two sets of documents.

FIG. 4 is a flow chart illustrating exemplary operations performed by comparison engine 220 in comparing two sets of documents. In general, comparison engine 220 may operate to solve the problem: given m documents (i.e., the number of documents in the first set) and n documents (i.e., the number of documents in the second set), generate m·n similarity scores that can be used to learn how the second set was changed relative to the first set. This change information can take the form of, for example, which documents are similar and what changes were made between similar documents, which documents were deleted from the second set to the first set, and which documents have been newly added to the second set.

In the exemplary implementations described herein, the two sets of documents will be described as two sets of files, such as two sets of files that define different versions of a program codebase. In other implementations, the two sets of documents may represent text documents other than software codebases. Also, it will be assumed that each file is treated as a series of discrete segments, such as lines, without ordering information between the lines. In the context of codebases, each line may correspond to a line of programming code.

Comparison engine 220 may begin a comparison operation by receiving the location of the sets of files that are to be compared (act 401). Each file set may, for example, be stored as a number of different files and subdirectories within a main directory. A user may input the two different main directories that contain the two file sets. Alternatively, the user may input a simple list of files for each of the two sets of files. In some implementations, the user may specify that the files in each set are to be separated into (exclusive) sets based on file types. For examples, all files with a ".cpp" extension could be in one set, all files with a ".h" extension could be in another set, and all files with a ".java" extension could be in yet another set. That is, a user can specificy a priori that a ".cpp" file will not be similar to a ".java" file. Comparison engine 220 may then be applied to each set independently.

Figure 5:
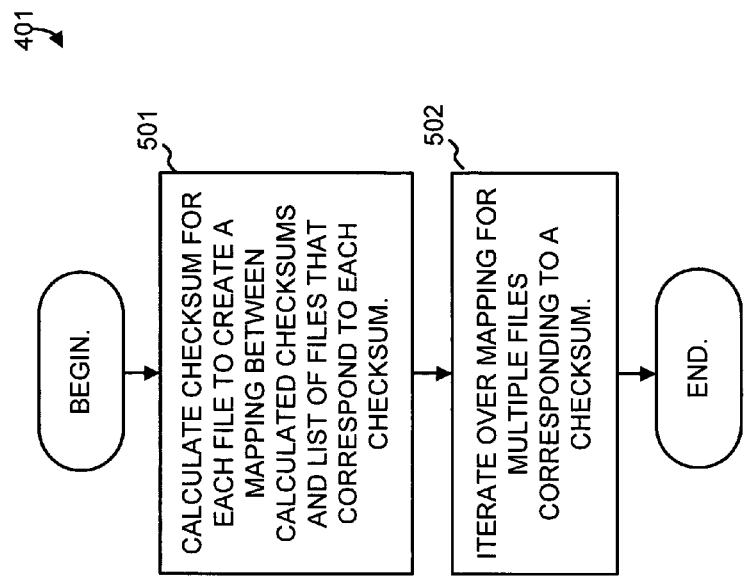
FIG. 5 is a flow chart illustrating one technique for removing identical files as performed in the flowchart of FIG. 4.

As an optional preprocessing step, identical files within the two file sets may next be removed from the two file sets (act 402). FIG. 5 is a flow chart illustrating one technique for removing identical files between the two sets. A checksum may be calculated for each file to create a mapping between calculated checksum values and a list of files that correspond to a checksum (act 501). A checksum, as is well known in the art, can represent a file or other data structures as a fixed length value based on the sum of the contents of the file (such as the sum of the bytes in the file). In one implementation, the checksum may be calculated based on the complete contents of each file. In other implementations, the checksum may be calculated based on a modified or normalized version of each line of each file, such as, for computer source code, on a version of the file in which comments or other non-essential information is removed. Within each line, it is often desirable to simply remove all whitespace.

Identical files across the sets may then be noted by iterating over the mapping for multiple files corresponding to a checksum (act 502). Multiple files having the same checksum can be inferred as identical files.

Referring back to FIG. 4, filename information can optionally be used to infer similarity between files (act 403). For instance, filenames between the first file set and the second file set can be analyzed for similar files by, for example, using a filename-based text comparison or by hashing the filenames to create a mapping between hash values and files.

Files that were found to be identical in either of or both of acts 402 and 403 can be marked as identical and do not need to be considered as part of the file sets for the operations performed in acts 404 through 406. At this point, assume that there are m files remaining in the first set and n files remaining in the second set.

As a simplified example of two file sets, consider the two example sets of files illustrated in FIG. 6, labeled as SET1 (Document set A) and SET2 (Document set B). SET1 includes four files (files $A_0$ through $A_3$), each of which corresponds to a row 610. More generally, SET1 may include m rows 610 (where m is 4 in this example). Each row may include a number of lines. In this example, for simplicity and brevity, each line is represented by a letter. In particular, each letter represents a line in the file or a checksum value generated from the line. For example, file $A_0$ in SET1 includes the lines: 'a', 'b', 'c', 'd', 'e', 'f', 'g', 'h', 'i', and 'j'. SET2 similarly includes a number of rows 620 that represent a number of files ($B_0$ through $B_4$), such as n files, where n equals five in this example. Each file includes a number of exemplary lines represented as letters. File $B_1$ in SET2 includes, for instance, the lines: 'd', 'f', 'h', 'j', and 'l'. File $B_1$ in SET2 includes a number of lines in common with file $A_0$ in SET1 (i.e., lines 'd', 'f', 'h', and 'j').

Comparison engine 220 may construct an index for each file set (act 404). The index may be an inverted index that maps from lines to lists of documents in which the lines are present. FIG. 7 is a diagram illustrating portions of such indexes for the first set and the second set of files. More particularly, index 725 represents an inverted index in which each line in the documents of the first set is mapped to the files in the first set in which the line occurs. For example, line 'a' in the first set occurs in file $A_0$ and line 'b' in the first set occurs in files $A_0$ and $A_3$. Similarly, index 730 represents an inverted index in which each line in the documents of the second set is mapped to the files in the second set in which the line occurs. In other words, indexes 725 and 730 may each include a number of rows that each relate a particular line or a succinct representation of the line, such as a checksum value, with the files in which the line occurs. In some implementations, two lines that are nearly but not exactly identical may be considered to be identical.

While creating indexes 725 and 730, comparison engine 220 may additionally record the number of lines in each file. These numbers may later be used when calculating similarity values (described in more detail below).

Indexes 725 and 730 may be intersected (act 405). The intersected index, which will be called a composite index herein, relates each line that occurs in both the first and second file sets to the files in which the lines occur. FIG. 8 is a diagram illustrating a portion of such a composite index 810. As can be seen from composite index 810, not all of the lines present in indexes 725 and 730 are present in composite index 810. Line 'o', for instance, which is not present in the first set of files, and line 'c', which is not present in the second set of files, are not present in composite index 810.

Composite index 810 may optionally be pruned (act 406). Pruning may be used to intelligently remove entries in composite index 810, which can simplify or help to speed up further processing performed on composite index 810. One of ordinary skill in the art will recognize that a number of possible pruning strategies could be used. Two of these possible pruning strategies will next be described in more detail.

A first possible pruning strategy may generally delete all entries out of the composite index except those where the line appears in exactly one document in each set. In other words, if a line appears in two or more documents in the first file set or the second file set, the line is deleted from composite index 810. If this pruning strategy was applied to composite index 810, for instance, the following lines would be deleted: 'b', 'd', 'e', 'f', 'g', 'h', 'i', 'j', 'k', 'l', 'm', 'n', and 'q'. In other words, only lines 'a' and 't' would remain.

This first pruning strategy, although potentially aggressive, can be relatively accurate in many cases. In the case of source code, this considers only lines of code that appear exactly once in each document set, which given the nature of source code, corresponds to the significant lines. That is, it could be said that these tend to be the lines that distinguish one file from another. From a computational complexity standpoint, this pruning technique can reduce computational complexity so that it varies linearly with the number of lines rather than quadratically.

A second, more conservative pruning technique, is based on the pruning of common or "junk" terms. Some lines may appear in a large number of files. In the C programming language, for example, lines such as "} else {" or "||" may tend to appear in a large number of the files. Such lines can be deleted from composite index 810. In one implementation, for example, lines that occur in a certain threshold number or portion of the files may be deleted. Line 'h', for example, occurs in all four of the files from the first file set. Accordingly, this line may be a candidate for pruning from composite index 810. Because iterating over all pairs of files is quadratic in computational difficulty, pruning lines that appear in many documents can lead to a large overall speed increase in calculating file similarity with little or no negative effect on the quality of the results.

When pruning with either the first or second pruning techniques described above, the number of lines recorded for each file may be correspondingly adjusted. Thus, if a particular line is removed that is present in one set of files, the number of lines recorded for each file in the set may be decremented by one.

In generating indexes 725 and 730 and composite index 810, each file may be sequentially read-in from disk only once. This can be particularly advantageous with large file sets, as, when a checksum is used as a proxy for a line, only the currently read-in line needs to be stored in memory at any given time.

Based on composite index 810, comparison engine 220 constructs a mapping that relates pairs of files in the two file sets to the number of lines that the pairs of files have in common (act 407). The mapping may be represented by a matrix referred to as a term count matrix herein.

FIG. 9 is a diagram illustrating an exemplary portion of a term count matrix 910 that stores the mapping constructed in act 407. Each row in term count matrix 910 relates a file pair to the number of lines present in both files of the pair. The first entry in term count matrix 910, for instance, indicates that file $A_0$ of SET1 and file $B_0$ of SET2 include five lines in common (the lines 'g', 'f', 'h', 'i', and 'j'). Term count matrix 910 may be constructed based on composite index 810 by going through each row (line) in composite index 810 and incrementing by one each appropriate file pair in term count matrix 910. For example, when line 'b' is processed, the number stored for file pair entries ($A_0$,$B_2$) and ($A_3$,$B_2$) will be incremented by one. If line 'b' is the first line encountered for file pair entries ($A_0$, $B_2$) or ($A_3$, $B_2$), this file pair entry may be initially placed in term count matrix 910 and set to a value of one. To save memory, file pairs with no lines in common will not be included in term count matrix 910. In other words, term count matrix may be a partial matrix of less than all the possible m·n file pairings.

In one possible implementation, when creating term count matrix 910, pairs of files in which the sizes of the files differ by a certain amount, such as by a certain number of lines or a predetermined percent, may be excluded from term count matrix 910. Depending on the situation, this option may be desirable, as a user may know a priori that files of significantly different sizes are not similar. One technique for excluding files based on size is to iterate through p·q file pairings and exclude those file pairings in term count matrix 910 that are determined to differ in size by the predetermined amount or more. Another possible technique, that can be more efficient in some situations, is based on generating a histogram of file sizes from each of SET1 and SET2 (or from subsets of SET1 and SET2). A file in a particular range in one of the histograms only needs to be compared to the files corresponding to the range in the second histogram. Accordingly, less than p·q file comparisons need to be performed.

Term count matrix 910 may next be used to generate a similarity score for each pair of files (i.e., each entry) in term count matrix 910 (act 408). In one implementation, the similarity score for each pair of files may be calculated as the maximum of: (1) the percent of lines of the first file of the pair that are present in the second file of the pair and (2) the percent of lines of the second file of the pair that are present in the first file of the pair. As an example of this, the similarity score for file pair ($A_0$, $B_0$) may be calculated as 0.5. This similarity is arrived at by dividing 5 (the number of lines in file $A_0$ in SET1 that are in file $B_0$ of SET2) into 10 (the number of lines in file $A_0$ of SET1) to obtain 0.5 and by dividing 5 (the number of lines in file $B_0$ of SET2 that are in file $A_0$ of SET1) into 20 (the number of lines in file $B_0$ of SET2) to obtain 0.25; and taking the larger of these two values (0.5). Other techniques for calculating a similarity score based on common lines could be used.

FIG. 10 is a diagram illustrating the term count matrix of FIG. 9, but additionally including a column 1011 containing a calculated similarity score for each entry in term count matrix 910. Each similarity score in column 1011 may be calculated using techniques such as those performed in act 408.

The file pairs may next be sorted by similarity score (act 408). File pairs that were previously determined to be identical in acts 402 and 403 may be added back into the file pairs that are being sorted and may be given a similarity score that indicates maximum similarity (e.g., a value of one in FIG. 10). To increasing sorting speed, file pairs below a predetermined similarity threshold may first be removed. Sorting by similarity score can be used to easily determine a relative relatedness of a pair of files. This can be done by manual or automatic examination of the similarity scores and files. FIG. 11 is a diagram illustrating an exemplary list of file pairs and their corresponding similarity scores. In FIG. 11, column 1115 represents the files in the first set, column 1120 represents the files in the second set, and column 1130 lists the sorted similarity score for each respective pair of files.

The sorted similarity scores can allow a user to quickly determine files that are particularly similar. From this information, a user can infer when one file was copied in its entirety to another, which may be important to the user. In the example of FIG. 11, for instance, visual inspection shows that there is a fairly hard similarity score cutoff around 0.8 as there are not any file pairs between 0.6 and 0.8. It is reasonable to infer that file pairs having a similarity score of 0.8 or greater are probably derived from one another. The user may then perform further file analysis, such as by manually "diffing" the file pairs determined to be similar to obtain more detailed information regarding how the file pairs are similar or by examining the common lines in each file pair. In other implementations, determining which file pairs are similar to one another based on the similarity scores can be done using more automated techniques, such as by pre-setting a similarity score threshold that classifies pairs of files as being similar.

Additional similar processing may be implemented in the determined pairs of potentially similar files. For example, the user may wish to calculate, for all file pairs that are above a similarity threshold, another similarity score based on a different similarity metric, such as an 'edit distance."

One of ordinary skill in the art will recognize that many of the specific techniques discussed above for determining similar pairs of documents are exemplary and that different techniques or modifications to these techniques are possible. Additionally, although the above discussion primarily relates to similarity of codebases, concepts consistent with those described may be applied to other applications, such as plagiarism detection or detection of duplicate code within the same codebase Instead of locating similar documents within two sets of files, similar files may be located within one set of documents. An example of this may be the situation in which similar web pages are to be located within a large set of web pages. Additionally, concepts similar to those discussed above may be applied to one set of documents or three or more sets of documents.

CONCLUSION

Comparison engine 220 may be used to compare sets of text documents in which the documents may generally represent any type of information. In the exemplary implementation discussed above, the sets of documents are files from two different codebases, such as two different versions of a program. The similarity information generated by comparison engine 220 may be used as a final comparison result or as a basis for additional comparisons. For example, a user may determine, based on the similarity scores generated by comparison engine 220, that two files are highly similar. The user may then compare the two files using well known file comparison software to display a marked-up version of the first file relative to the second file.

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

Moreover, while a series of acts have been described with regard to FIGS. 4 and 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A computer-implemented method for comparing a first set of documents to a second set of documents, the method comprising:
   identifying, using a computer-implemented device, the first set of documents based on a first criterion;
   identifying, using the computer-implemented device, the second set of documents based on a second criterion, where the second criterion is different from the first criterion;
   constructing a matrix using the computer-implemented device, the matrix containing information regarding pairs of documents from the first and second sets of documents, where constructing the matrix further comprises:
      mapping, using the computer-implemented device and to each of the pairs of documents, a value representative of a number of lines that are common to both documents in each of the pairs of documents, where each of the pairs of documents comprises a document from the first set of documents and a document from the second set of documents, and
      excluding, using the computer-implemented device, a pair of documents from the matrix, when the documents, in the pair of documents, differ in size by at least a particular amount;
   calculating similarity scores, using the computer-implemented device, for each of the pairs of documents based on the matrix, where the similarity score is calculated for a pair of documents, of the pairs of documents, by:
      determining a first ratio of the number of lines that are common to the pair of documents and a number of lines of a first document of the pair of documents,
      determining a second ratio of the number of lines that are common to the pair of documents and a number of lines of a second document of the pair of documents, where the first ratio is different than the second ratio,
      selecting the first ratio or the second ratio as a selected ratio, and
      determining the similarity score based on the selected ratio; and
   outputting the similarity scores, using the computer-implemented device.

2. The method of claim 1, further comprising:
   constructing an index, using the computer-implemented device, relating each line in the first and second sets of documents to documents in the first and second sets of documents in which each of the lines occurs; and
   using the index to construct the matrix.

3. The method of claim 2, where constructing the index further comprises:
   sequentially reading each of the lines, using the computer-implemented device, in the documents from the first and second sets into computer memory.

4. The method of claim 1, where the first and second sets of documents include text files.

5. The method of claim 4, where the text files are files in a program codebase.

6. The method of claim 1, where the lines include lines of programming code.

7. The method of claim 1, further comprising:
   sorting the pairs of documents, using the computer-implemented device, based on the similarity scores.

8. The method of claim 1, further comprising:
   locating documents, using the computer-implemented device, in the first and second sets of documents that are identical; and
   removing the documents, using the computer-implemented device, in the first and second sets of documents that are identical from the first and second sets of documents before constructing the matrix.

9. The method of claim 8, where locating documents in the first and second sets of documents that are identical includes:
   locating the identical documents, using the computer-implemented device, based on checksum values calculated for each of the documents in the first and second sets of documents, where the checksum values of the identical documents are the same.

10. The method of claim 8, where locating documents in the first and second sets of documents that are identical include:
    locating the identical documents based on filenames of the documents in the first and second sets of documents, where the filenames of the identical documents are the same.

11. A device comprising:
    one or more processors to:
       identify a first set of documents based on a first criterion;
       identify a second set of documents based on a second criterion, where the second criterion is different from the first criterion;
       construct a matrix containing information regarding pairs of documents selected from the first and second sets of documents, where, when constructing the matrix, the one or more processors are further to:
          map a tag identifying a number of lines that are common to both documents in each of the pairs of documents, where each of the pairs of documents comprises a document from the first set of documents and a document from the second set of documents, and
          exclude a pair of documents from the matrix, when the documents, in the pair of documents, differ in size by at least a particular amount;
       store the matrix;
       calculate similarity scores for each of the pairs of documents based on the matrix, where, when calculating the similarity score for a pair of documents, of the pairs of documents, the one or more processors are further to:
          determine a first ratio of the number of lines that are common to the pair of documents and a number of lines of a first document of the pair of documents,
          determine a second ratio of the number of lines that are common to the pair of documents and a number of lines of a second document of the pair of documents, where the first ratio is different than the second ratio, select the first ratio or the second ratio as a selected ratio, and determine the similarity score based on the selected ratio; and output the similarity scores.

12. The device of claim 11, where the one or more processors are further to:

exclude from the matrix, when constructing the matrix, pairs of documents in which the document from the first set of documents and the document from the second set of documents do not have a same file extension.

13. A computer-implemented method comprising:

receiving, using a computer-implemented device, an identification of a first set of documents;

receiving, using the computer-implemented device, an identification of a second set of documents, the identification of the second set of documents being based on a different criterion than a criterion used in the identification of the first set of documents;

processing document segments, using the computer-implemented device, which represent portions of the documents in the first and second sets of documents, to construct an index that relates each of the segments to the documents in which the segment occurs;

constructing a matrix, using the computer-implemented device, based on the index, the matrix mapping pairs of documents from the first and second sets of documents to a numeric value representative of a number of segments that are common to both documents of a particular pair of documents, where each pair of documents comprises a document from the first set of documents and a document from the second set of documents;

excluding from the matrix, using the computer-implemented device, pairs of documents, when the documents in a pair of documents differ in size by at least a particular amount;

calculating, using the computer-implemented device, similarity scores for pairs of documents in the first and second sets of documents based on the matrix, where the similarity score is calculated for a pair of documents, of the pairs of documents, by:

determining a first ratio of the number of segments that are common to the pair of documents and a number of segments of a first document of the pair of documents, determining a second ratio of the number of segments that are common to the pair of documents and a number of segments of a second document of the pair of documents, where the first ratio is different than the second ratio, selecting the first ratio or the second ratio as a selected ratio, and determining the similarity score based on the selected ratio; and outputting, using the computer-implemented device, the similarity scores.

14. The method of claim 13, where processing document segments in the first and second sets of documents includes:

sequentially processing the segments, using the computer-implemented device, to construct the index, where previously processed segments are not stored in computer memory.

15. The method of claim 13, where the first and second sets of documents include text files.

16. The method of claim 15, where the text files are files in a program codebase.

17. The method of claim 16, where the segments each represents a line of programming code.

18. The method of claim 13, further comprising:

sorting the pairs of documents, using the computer-implemented device, based on the similarity scores.

19. The method of claim 13, further comprising:

locating documents, using the computer-implemented device, in the first and second sets of documents that are identical; and removing the documents, using the computer-implemented device, in the first and second sets of documents that are identical from the first and second sets of documents before constructing the index.

20. The method of claim 19, where locating the documents in the first and second sets of documents that are identical includes:

locating the documents, using the computer-implemented device, in the first and second sets of documents that are identical based on checksum values calculated for each of the documents in the first and second sets of documents.

21. A computer-implemented system comprising:

a memory to store a matrix relating pairs of documents; and a processor, coupled to the memory, to:

identify a first document set based on a first criterion;

identify a second document set based on a second criterion, where the second criterion is different from the first criterion;

locate pairs of documents, in the first and second document sets, that are identical;

remove the identical documents from the first and second document sets;

construct the matrix, after removing the identical documents, by relating pairs of documents from the first document set and the second document set to generate the pairs of documents, and by mapping, to each of the pairs of documents, an indicator representing a number of lines that are common to both documents, in each of the pairs of documents, and by excluding a pair of documents from the matrix, when the documents, in the pair of documents, differ in size by at least a particular amount;

add the identical documents into the matrix, after constructing the matrix; and calculate similarity scores for the pairs of documents, based on the matrix, after adding the identical documents, where, when calculating the similarity score for a pair of documents, of the pairs of documents, the processor is further to:

determine a first ratio of the number of lines that are common to the pair of documents and a number of lines of a first document of the pair of documents, determine a second ratio of the number of lines that are common to the pair of documents and a number of lines of a second document of the pair of documents, where the first ratio is different than the second ratio, select the first ratio or the second ratio as a selected ratio, and determine the similarity score based on the selected ratio; and output the similarity scores.

22. The computer-implemented system of claim 21, where the processor is further to:

construct an index relating each line in the first and second document sets to documents in the first and second document sets in which each of the lines occurs; and use the index to construct the matrix.

23. The computer-implemented system of claim 21, where pairs of identical documents having a similarity score below a predetermined threshold value are removed from the matrix.

24. A non-transitory computer-readable memory medium comprising:
one or more instructions which, when executed by at least one processor, cause the at least one processor to receive an identification of a first set of documents;
one or more instructions which, when executed by the at least one processor, cause the at least one processor to receive an identification of a second set of documents, the identification of the second set of documents being based on a different criterion than a criterion used in the identification of the first set of documents;
one or more instructions which, when executed by the at least one processor, cause the at least one processor to process document segments that represent portions of the documents in the first and second sets of documents to construct an index that relates each of the segments to the documents in which the segment occurs;
one or more instructions which, when executed by the at least one processor, cause the at least one processor to construct a matrix, based on the index, containing information regarding pairs of documents from the first and second sets of documents, where the one or more instructions to construct the matrix further include one or more instructions to:
map a numeric indicator representing a number of segments that are common to both documents of a particular pair of documents, where each of the pairs of documents comprises a document from the first set of documents and a document from the second set of documents; and
exclude from the matrix, when constructing the matrix, a pair of documents, where the documents in the pair differ in size by at least a particular amount;
one or more instructions which, when executed by the at least one processor, cause the at least one processor to calculate similarity scores for pairs of documents in the first and second sets of documents, based on the matrix, where the similarity score is calculated for a pair of documents, of the pairs of documents, and the one or more instructions to calculate the similarity score include:
one or more instructions to determine a first ratio of the number of lines that are common to the pair of documents and a number of lines of a first document of the pair of documents,
one or more instructions to determine a second ratio of the number of lines that are common to the pair of documents and a number of lines of a second document of the pair of documents, where the first ratio is different than the second ratio,
one or more instructions to select the first ratio or the second ratio as a selected ratio, and
one or more instructions to determine the similarity score based on the selected ratio; and
one or more instructions which, when executed by the at least one processor, cause the at least one processor to output the similarity scores.

25. The medium of claim 24, further comprising:
one or more instructions to generate a first histogram of file sizes for the first set of documents and a second histogram of file sizes for the second set of documents; and
one or more instructions to include in the matrix, when constructing the matrix, only pairs of documents where both documents for a particular pair of documents have a file size within a particular range, based on the first histogram and the second histogram.

26. A computer-implemented method, for comparing a first set of documents to a second set of documents, the method comprising:
receiving, using a computer-implemented device, an identification of a first set of documents;
receiving, using the computer-implemented device, an identification of a second set of documents;
processing lines from the documents, using the computer-implemented device, in the first and second sets of documents to construct an index that relates each line in the first and second sets of documents to documents in the first and second sets of documents in which the line occurs, each of the lines representing a line of programming code;
removing, from the index and using the computer-implemented device, lines based on one or more of:
a line appearing in only one document in the first set of documents or in only one document in the second set of documents, or
a line appearing in more than a threshold number of documents;
constructing, based on the index and using the computer-implemented device, a matrix containing information regarding pairs of documents from the first and second sets of documents, where constructing the matrix further comprises:
mapping a numeric tag representative of a number of lines that are common to both documents in each of the pairs of documents;
calculating, using the computer-implemented device, similarity scores for the pairs of documents based on the matrix, where the similarity score is calculated for a pair of documents, of the pairs of documents, by:
determining a first ratio of the number of lines that are common to the pair of documents and a number of lines of a first document of the pair of documents,
determining a second ratio of the number of lines that are common to the pair of documents and a number of lines of a second document of the pair of documents, where the first ratio is different than the second ratio,
selecting the first ratio or the second ratio as a selected ratio, and
determining the similarity score based on the selected ratio; and
outputting, using the computer-implemented device, the similarity scores.

* * * * *